(No Model.)
W. T. JEBB.
METHOD OF MANUFACTURING MALT LIQUORS FROM STARCH, &c.
No. 316,367. Patented Apr. 21, 1885.
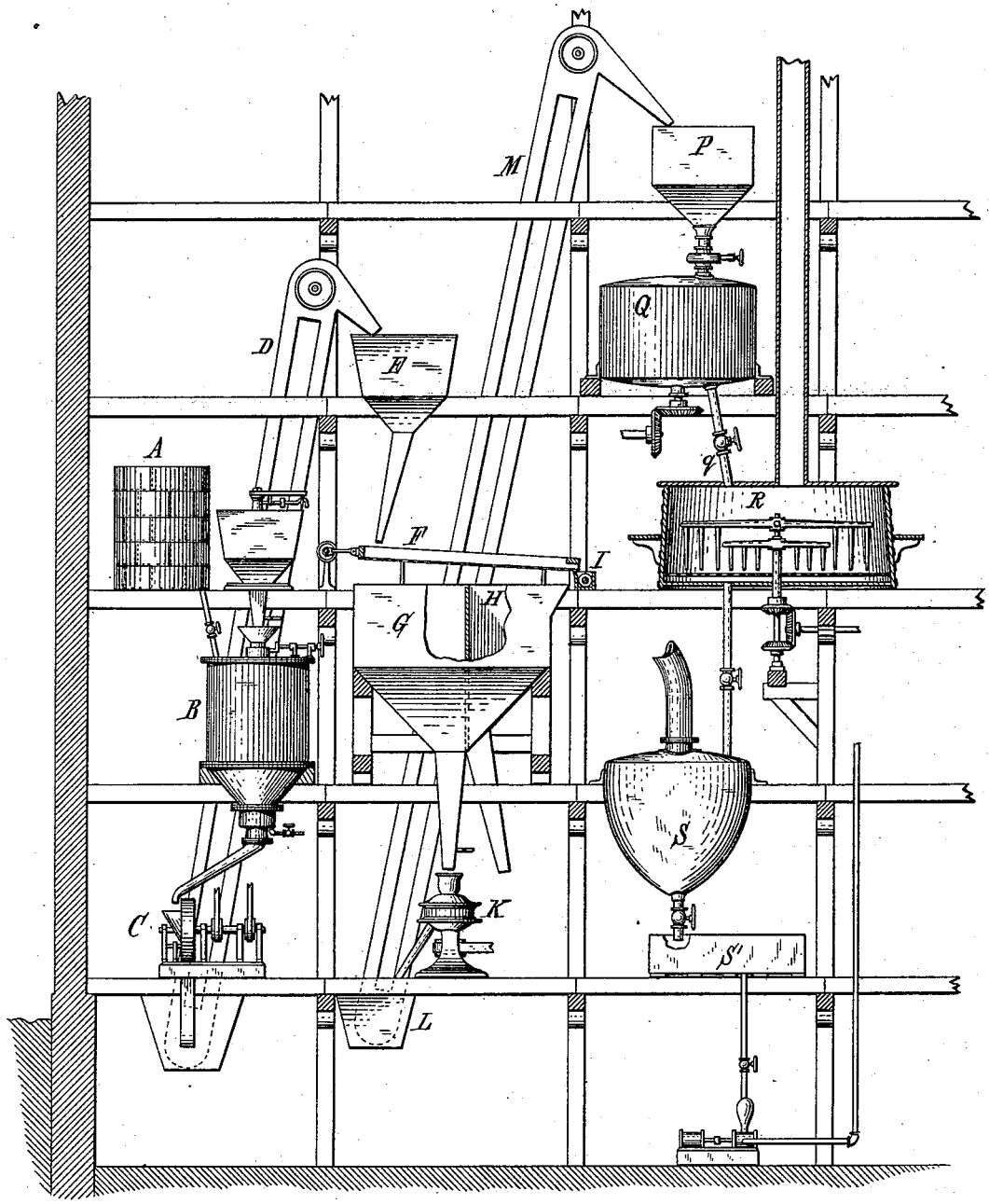

UNITED STATES PATENT OFFICE.

WILLIAM T. JEBB, OF BUFFALO, NEW YORK.

METHOD OF MANUFACTURING MALT LIQUORS FROM STARCH, &c.

SPECIFICATION forming part of Letters Patent No. 316,367, dated April 21, 1885.

Application filed March 27, 1885. (No specimens.)

*To all whom it may concern:*

Be it known that I, WILLIAM T. JEBB, of the city of Buffalo, in the county of Erie and State of New York, have invented new and useful Improvements in the Method of Manufacturing Malt Liquors from Starch, &c., of which the following is a specification.

This invention relates to an improvement in the manufacture of beer or ale from barley-malt and the starch derived from Indian corn or maize. A kernel of Indian corn consists of three principal parts, viz: the inner portion or body, which consists principally of starch-cells; the outer inclosing skin or husk and its glutinous lining, which consist of wood fiber and gluten or nitrogenous compounds, albumen, and oil, which are useful for cattle-feed; and the germ or chit, which is very rich in oil, the latter constituting about seventy per cent. of its component parts. The starchy inner portions of the corn are very desirable for brewing beer or ale, as they produce a strong and light-colored wort, but the husks, gluten, and germs are very objectionable because they not only discolor the wort, but also cause the formation of deleterious substances or impurities in the product and impart to it a rank unpleasant taste or flavor and impair its keeping qualities. The object of this invention is to avoid these difficulties, and my invention consists of the improvements which will be hereinafter fully described, and pointed out in the claims.

The accompanying drawing represents an elevation of a plant of machinery by which my invention can be practiced.

A represents a water-tank which contains hot water used for steeping the corn.

B represent a tank or vat in which the corn is steeped, and which is supplied with water from the tank A and constructed with a perforated false bottom for draining. The corn is steeped in this tank at a temperature of about 140° Fahrenheit for about fifteen hours, whereby the grain becomes expanded or swelled. This temperature is maintained in the steeping-tank by renewing the water from time to time. When the corn has been steeped, the starchy body of each kernel has become enlarged, pulpy, and soft, and the germ has become similarly enlarged and tends to separate itself, by reason of its oily character, from the surrounding portions of the starchy body, which has become saturated with water, and the husk or skin has become tough and tends to separate from the starchy body and oily germ. In steeping the corn, care is taken that the temperature does not rise to 155° Fahrenheit, at which temperature the sacks of the starch-cells begin to burst and discharge their contents. When the corn has been steeped, the warm water is drained off and cold water is introduced into the tank B, whereby the corn is chilled and the skins or husks are further toughened and the oily germs further loosened from the surrounding portions of the starchy bodies. The water is then drained off from the corn in the tank B.

C represents a reducing-machine which receives the steeped corn from the tank B, and in which the grain is whipped or beaten, whereby the husks or skins and their glutinous linings are opened and stripped in large flakes from the inner starchy bodies and from the germs, the starchy bodies being at the same time reduced to fine granules, while the germs are detached from the starchy portions and skins without being broken. The reducing-machine C consists of several concentric rows of beaters revolving at a high speed in opposite directions within an inclosing-case. In order to facilitate the discharge of the material from this machine, the outer row of beaters is provided with one or more scrapers, which prevent the material from adhering to the inner side of the inclosing-case of the machine. The reduced material is discharged from the reducing-machine C into the foot of an elevator, D, whereby it is conducted to a receiving-hopper, E.

F represents a separating-screen, which receives the reduced material from the hopper E and separates the same into three products—viz., the fine fragments or granules of crude starch, the germs, which are somewhat larger in size, and the flakes of skins or husks and glutinous linings, which are still larger. To this end the screen is clothed for about two-thirds of its length from its head with fine-wire cloth, which permits only the starch granules to pass through, and for the remainder of its length with coarse-wire cloth, which permits the germs to pass through, while the skins or coarse offal escape over the tail of the screen.

G represents a receiver, which collects the starchy material which passes through the upper finely-clothed portion of the screen.

H represents a receiver, which collects the germs passing through the lower coarsely-clothed portion of the screen, and I is a conveyer which collects the skins escaping over the tail of the screen.

K represents a reducing-mill, which receives the material from the receiver G, and which is preferably employed to reduce the material to a higher degree of fineness. The mill preferably employed for this purpose is known as the "Bogardus mill," and consists, essentially, of two serrated or grooved disks having a slight eccentric movement with reference to each other, whereby the gumming or clogging of the disks by the material is avoided.

L is a receiver, which receives the ground material from the mill K, and M is an elevator, whereby the ground material is elevated to a receiving-hopper, P.

Q represents a closed developing tank or vessel which receives the meal from the hopper P, and in which the meal is boiled under pressure and at a high temperature for the purpose of developing the starch and preparing the same for mashing. The tank Q is provided with a revolving agitator or stirrer and with suitable steam-pipes, a safety-valve, and a pressure-gage for regulating the process of developing the starch. In this tank the meal is mixed with water and boiled under a pressure of about forty pounds to the square inch for several hours until the starch has been fully developed. The process of developing the starch proceeds rapidly and uniformly, because the meal under treatment has been freed from the coarse refuse and consists of fine starch granules of uniform size, whereby the heat is enabled to act uniformly upon all the starchy particles under treatment, thereby preventing the formation of lumps or aggregations of partly-developed starch, and rendering the mixture much less liable to be scorched, burned, or discolored.

R represents the mash-tub, in which the barley-malt is mashed in the usual manner, and which receives also the developed starch-liquid from the tank Q by a pipe, q. In this tub the barley-malt and developed corn-starch are mashed together in suitable proportions, which will depend somewhat upon the nature of the product which is designed to be produced. The developed corn-starch is readily converted in the process of mashing, and forms, with the barley-malt, a heavy wort of light color, which is free from the objectionable impurities and flavors which are ordinarily found in worts produced by the addition of cornmeal to barley-malt. When the process of mashing is completed, the wort is drained off from the grains and drawn into the copper or kettle S, in which it is boiled and in which the hops are added. The boiled wort is then drained through the hops in the hop-back S' and cooled, fermented, and further treated or stored in any usual or well-known manner.

The beer or ale produced in this manner is of excellent quality, free from any objectionable taste or flavor, and of a very light color, as the coloring ingredients of the corn have been thoroughly removed. This process can also be advantageously employed in the manufacture of dark-colored beer and ale, because the starch-meal furnishes a very desirable substitute for a portion of the malt ordinarily employed, as it produces a large yield of wort, while being much cheaper than barley-malt.

The husks and grains may be utilized as feed for cattle, either by immediate consumption in a moist condition, or, if not required for immediate use, after drying the same, which can be accomplished at small expense, as this offal contains but a small percentage of moisture.

It is obvious that the arrangement of the parts of the apparatus may be modified in accordance with the space at disposal and the general form or character of the building in which it is placed.

I claim as my invention—

1. The herein-described method of producing a wort suitable for the manufacture of beer or ale, which consists in freeing the starchy portions of the kernels of Indian corn or maize from the husks and germs by steeping, whipping, and sifting, and then mashing the separated starchy material together with barley-malt and draining off the wort, substantially as set forth.

2. The herein-described method of producing a wort suitable for the manufacture of beer or ale, which consists in freeing the starchy portions of the kernels of Indian corn or maize from the husks and germs by steeping, whipping, and sifting, then boiling the separated material to develop the starch, and then mashing the developed starch together with barley-malt and draining off the wort, substantially as set forth.

3. The herein-described method of manufacturing beer or ale, which consists in freeing the starchy portions of the kernels of Indian corn or maize from the husks and germs by steeping, whipping, and sifting, then mashing the separated starchy material together with barley-malt and draining off the wort, then boiling the wort, adding the hops, draining off the liquid, and cooling and fermenting the same, substantially as set forth.

Witness my hand this 24th day of March, 1885.

WILLIAM T. JEBB.

Witnesses:
AUSTIN TYLER,
W. ELMORE.